May 4, 1926.
J. T. CLARK
PNEUMATIC TIRE
Filed Nov. 12, 1923
1,583,388
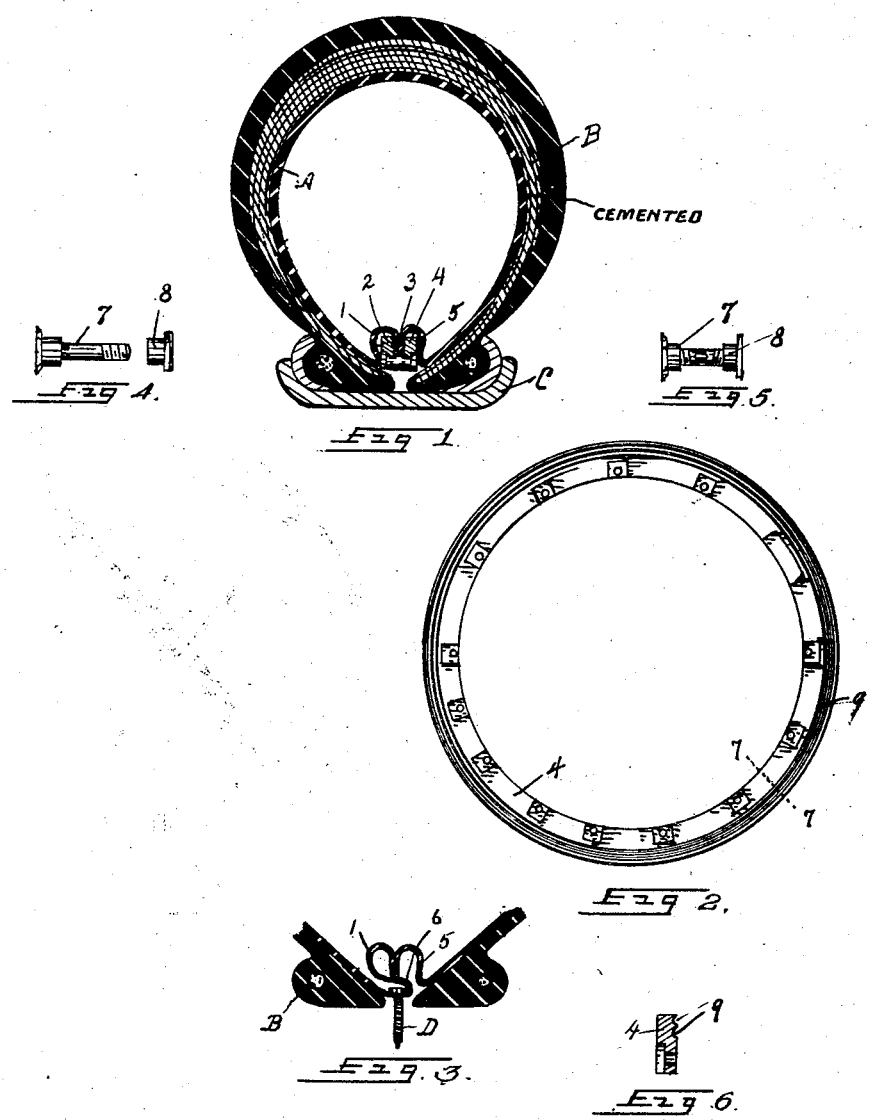

Patented May 4, 1926.

1,583,388

UNITED STATES PATENT OFFICE.

JOHN T. CLARK, OF PROVO, UTAH.

PNEUMATIC TIRE.

Application filed November 12, 1923. Serial No. 674,104.

*To all whom it may concern:*

Be it known that I, JOHN T. CLARK, a citizen of the United States, residing at Provo, in the county of Utah and State of Utah, have invented certain new and useful Improvements in Pneumatic Tires, of which the following is a specification.

My invention relates to pneumatic tires for road vehicles, such as automobiles and trucks, and has for its object to provide a single tube pneumatic tire, with an improved sealing device whereby a single tube tire may be quickly placed and secured on a rim, and the edges of the tire sealed so that it may be inflated with air as any other pneumatic tire.

These objects I accomplish with the device illustrated in the accompanying drawings in which similar letters and numerals of reference indicate like parts throughout the several views, and as described in the specification forming a part of this application and pointed out in the appended claims.

In the drawings in which I have shown a substantial embodiment of my invention, Figure 1 is a transverse radial section of my tire and the rim of a wheel. Figure 2 is a side elevation of one of the clamping washers between which the extreme edges of my tire are gripped. Figure 3 is a radial section of the edges of the tire with the air valve in place, but not showing the clamping washers nor the bolts and nuts of the clamping means. Figure 4 is a plan view of one of the bolts and nuts disconnected. Figure 5 is a plan view showing the assembled bolt and nut. Figure 6 is a radial section of one of the clamping washers on line 7—7 of Figure 2.

My sealing means may be used on specially constructed new outer casings or may be used on any of the standard outer casings, and my invention consists in a soft rubber inner tube or liner A which is to be cemented to the inner face of the outer casing B with a rubber cement which may be partially vulcanized after it is used to fasten said liner in the outer casing B, and before the tire is to be secured on the rim C. The said liner A is made of layers of rubber, similar to the materials which are now in use for and in tire construction. The edges of said liner A are made wider and extend beyond the edges of the outer casing, as shown at 1 and 5, and the extreme edges of which are to be curved or bent and brought contiguous at the annular circle, shown at 3. A portion of one of said edges 1 is made or shaped to allow an extended air loop 6 to be formed therein, and to which the air valve D is fastened by any of the approved methods now in use. The clamping washers 2 and 4 are used in the folds 1 and 5 of said liner A edges to grip the edges of the said liner A edges to grip the edges of the short bolts 7 when drawn together by the short bolts 7 and nuts 8 screwed thereon. The bolts 7 may be rotated or the nuts 8 turned on the threads of the bolts as desired. The edges of the outer casing B are far enough apart to allow a wrench or other tool to engage the bolt or nut and draw the said edges 1 and 5 of the liner A together at the lap, or where they are contiguous. A portion of the adjacent side faces of the clamping washers 2 and 4 are annularly grooved, as at 9, to form a more perfect seal where the edges 1 and 5 are contiguous.

In assembling my tire, the liner A is cemented to the inner face of the outer casing B, and the air valve is secured in one or the other of the edges of said liner A. The clamping washers 2 and 4 are then inserted within their respective loops and with the grooved faces 9, 9, adjacent and bearing against the portion, 1 and 5 forming an annular contact, as shown at 3. The lapped portions of the said edges 1 and 5 are then coated with rubber cement on said contact line 3 and the bolts and nuts, which have previously been inserted through small holes in the lapped portions of said liner A, are turned up, whereby the said edges 1 and 5 are forced together and an air-tight joint secured. The tire may then be placed on the said rim C as any other tire and inflated through the air valve D.

Having thus described my invention and its operation I desire to secure by Letters Patent and claim:—

1. A pneumatic tire comprising an outer casing; a liner cemented to the inner wall of said casing and having extended edges thereon and curved to form an annular loop on each edge; an annular washer in each of said loops; annular grooves in the adjacent faces of said washers; and means to draw said washers toward each other and thereby seal the contiguous sides of said loops one to the other.

2. A pneumatic tire comprising an inner liner which is cemented to a casing, and which liner has its edges formed into adjacent loops with sides of said loops contiguous; an annular washer in each of said loops; and means to draw said washers toward each other and thereby seal the contiguous sides of said loops one to the other.

In testimony whereof I have affixed my signature.

JOHN T. CLARK.